(12) United States Patent
    Li

(10) Patent No.: US 10,782,688 B2
(45) Date of Patent: Sep. 22, 2020

(54) METHOD, CONTROL APPARATUS, AND SYSTEM FOR TRACKING AND SHOOTING TARGET

(71) Applicant: AUTEL ROBOTICS CO., LTD., Shenzhen, Guangdong (CN)

(72) Inventor: Zuoguang Li, Guangdong (CN)

(73) Assignee: AUTEL ROBOTICS CO., LTD., Shenzhen, Guangdong (CN)

( * ) Notice: Subject to any disclaimer, the term of this patent is extended or adjusted under 35 U.S.C. 154(b) by 184 days.

(21) Appl. No.: 16/002,548

(22) Filed: Jun. 7, 2018

(65) Prior Publication Data
    US 2018/0284777 A1    Oct. 4, 2018

Related U.S. Application Data

(63) Continuation of application No. PCT/CN2016/096070, filed on Aug. 19, 2016.

(30) Foreign Application Priority Data

Dec. 10, 2015    (CN) .......................... 2015 1 0916635

(51) Int. Cl.
    *G05D 1/00*    (2006.01)
    *G06T 7/20*    (2017.01)
    (Continued)

(52) U.S. Cl.
    CPC .......... *G05D 1/0094* (2013.01); *B64C 39/024* (2013.01); *G05D 1/12* (2013.01);
    (Continued)

(58) Field of Classification Search
    CPC ...... G05D 1/0094; G05D 1/12; B64C 39/024; B64C 2201/127; B64C 2201/141;
    (Continued)

(56) References Cited

U.S. PATENT DOCUMENTS 9,164,506 B1 *    10/2015    Zang ..................... G05D 1/0038
2015/0248584 A1 *    9/2015    Greveson ................. G06K 9/46
                                                        382/113
(Continued)

FOREIGN PATENT DOCUMENTS

CN        102074016 A    5/2011
CN        103149939 A    6/2013
(Continued)

OTHER PUBLICATIONS

Han et al., CN 103149939, Jun. 12, 2013 (machine translation).*
(Continued)

*Primary Examiner* — Yazan A Soofi
*Assistant Examiner* — Naeem Taslim Alam

(57) ABSTRACT

The present invention relates to the field of electronic photographing technologies, and provides a method, a control apparatus and a system for tracking and shooting a target. The method includes: in a tracking and shooting process, controlling, by a control apparatus, a photographing apparatus on an unmanned aerial vehicle to collect an image, and obtaining the collected image; selecting a tracked target in the image; calculating a movement speed, a movement direction and a location on the current image that are of the tracked target according to comparison between consecutive neighboring frame images; and controlling, according to the calculated movement speed, movement direction and location on the current image, the unmanned aerial vehicle to track the tracked target, so that the tracked target is always located on the image collected by the photographing apparatus. According to the present invention, tracking and shooting can be automatically performed on a target in an aerial shooting process, without a need to manually remotely control the unmanned aerial vehicle to track a moving target. Therefore, locating precision is high, the moving target can (Continued)

be tracked and shot, and a high-quality video or photo can be obtained.

16 Claims, 5 Drawing Sheets

(51) Int. Cl.
| | |
|---|---|
| *H04N 5/232* | (2006.01) |
| *G06K 9/66* | (2006.01) |
| *G06K 9/68* | (2006.01) |
| *G06K 9/00* | (2006.01) |
| *G06K 9/46* | (2006.01) |
| *G06K 9/62* | (2006.01) |
| *B64C 39/02* | (2006.01) |
| *G05D 1/12* | (2006.01) |
| *G06F 16/22* | (2019.01) |

(52) U.S. Cl.
CPC ......... *G06K 9/0063* (2013.01); *G06K 9/4671* (2013.01); *G06K 9/6202* (2013.01); *G06K 9/66* (2013.01); *G06K 9/6857* (2013.01); *G06T 7/20* (2013.01); *H04N 5/232* (2013.01); *B64C 2201/127* (2013.01); *B64C 2201/141* (2013.01); *G06F 16/22* (2019.01); *G06K 2209/21* (2013.01); *G06T 2207/10016* (2013.01); *G06T 2207/10032* (2013.01); *G06T 2207/20092* (2013.01); *G06T 2207/30241* (2013.01)

(58) Field of Classification Search
CPC .. G06K 9/0063; G06K 9/4671; G06K 9/6202; G06K 9/66; G06K 9/6857; G06K 2209/21; G06T 7/20; G06T 2207/10016; G06T 2207/10032; G06T 2207/20092; G06T 2207/30241; H04N 5/232; G06F 16/22
See application file for complete search history.

(56) References Cited

U.S. PATENT DOCUMENTS

| | | | | |
|---|---|---|---|---|
| 2017/0053167 | A1* | 2/2017 | Ren | G06T 3/40 |
| 2018/0365843 | A1* | 12/2018 | Cheng | G06K 9/00718 |

FOREIGN PATENT DOCUMENTS

| | | |
|---|---|---|
| CN | 103455797 A | 12/2013 |
| CN | 104036524 A | 9/2014 |
| CN | 104574384 A | 4/2015 |
| CN | 1105023278 A | 11/2015 |
| CN | 105578034 A | 5/2016 |
| WO | 2014/049372 | 4/2014 |

OTHER PUBLICATIONS

Han et al., CN 103149939, Jun. 12, 2013 (machine translation) (Year: 2013).*
International Search Report dated Nov. 18, 2016; PCT/CN2016/096070.
Chinese Examination Report dated Jan. 26, 2018; Appln. No. 201510916635.0.
Navid Nourani-Vatani et al; "A Study of Feature Extraction Algorithms for Optical Flow Tracking", Proceedings of Australasian Conference on Robotics and Automation, Dec. 3-5, 2012, Victoria University of Wellington, New Zealand 7 pages.
Olov Samuelsson; "Video Tracking Algorithm for Unmanned Aerial Vehicle Surveillance", Master's Degree Project; Stockholm, Sweden Jun. 2012. 76 pages.
Ahlem Walha, et al; "Video stabilization with moving object detecting and tracking for aerial video surveillance", Multimed Tools Appl (Sep. 2015) vol. 74, Issue 17:6745-6767; Published online: Apr. 5, 2014.
Xuqiang Zhao, et al; "Vision Based Ground Target Tracking for Rotor UAV", 2013 10th IEEE International Conference on Control and Automation (ICCA) Hangzhou, China, Jun. 12-14, 2013, p. 1907-1911.
Supplementary European Search Report dated Jul. 31, 2018; Appln. No. EP 16 87 2145.

* cited by examiner

METHOD, CONTROL APPARATUS, AND SYSTEM FOR TRACKING AND SHOOTING TARGET

CROSS REFERENCE

This application is a continuation of International Application No. PCT/CN2016/096070, filed on Aug. 19, 2016, which claims priority to Chinese Patent Application No. 201510916635.0 filed on Dec. 10, 2015, which is incorporated herein by reference in its entirety.

TECHNICAL FIELD

The present invention relates to the field of electronic photographing technologies, and in particular, to a method, a control apparatus and a system for tracking and shooting a target.

RELATED ART

In the prior art, when an unmanned aerial vehicle is tracking and shooting a target, the unmanned aerial vehicle performs shooting by using a carried photographing apparatus in most cases. However, when shooting is performed by the unmanned aerial vehicle, a remote control needs to be manually controlled for tracking and shooting. When a shooting target is in a moving state, it cannot be ensured that the unmanned aerial vehicle and the shooting target synchronously move, the shooting target cannot be always located at an ideal location in a shooting picture, and stability of the movement of the unmanned aerial vehicle cannot be ensured. Therefore, it is difficult to ensure quality of the shooting picture.

Therefore, it is necessary to provide a method, a control apparatus and a system for tracking and shooting a target, so as to realize intelligently tracking and shooting the target, and overcome a defect in the prior art that when the unmanned aerial vehicle is manually controlled remotely for tracking and shooting, it is difficult to track a moving target that is moving at a high speed, irregularly or at a variable speed and a shooting effect is poor.

SUMMARY

The present invention is intended to provide a method, a control apparatus and a system for tracking and shooting a target, so as to overcome a defect in the prior art that when an unmanned aerial vehicle is manually controlled remotely for tracking and shooting, it is difficult to track a moving target that is moving at a high speed, irregularly or at a variable speed and a shooting effect is poor.

To resolve the foregoing technical problem, embodiments of the present invention provide the following technical solutions:

According to an aspect, an embodiment of the present invention provides a method for tracking and shooting a target, applied to an unmanned aerial vehicle shooting, and the method includes:

controlling, by a control apparatus, a photographing apparatus on the unmanned aerial vehicle to collect an image and obtaining the collected image in a tracking and shooting process;

selecting a tracked target in the image;

calculating a movement speed, a movement direction and a location on the current image that are of the tracked target; and controlling, according to the calculated movement speed, movement direction and location on the current image, the unmanned aerial vehicle to track the tracked target, so as to make the tracked target always locate on the image collected by the photographing apparatus.

In some embodiments, the selecting the tracked target in the image includes:

receiving, through a user interface, a user input signal that indicates a selection of the tracked target from the user, and determining the tracked target on the image according to the user input signal; or identifying and analyzing the collected image, and determining a moving target on the image as the tracked target according to an analysis result.

In some embodiments, after the selecting the tracked target in the image, the method further includes:

extracting a characteristic point of the tracked target;

recording a set of extracted characteristic point and a quantity of the extracted characteristic point, and generating a characteristic template; and storing the characteristic template into a template library.

In some embodiments, in a process of controlling the unmanned aerial vehicle to track the tracked target, the method further includes:

extracting a characteristic point of the tracked target;

recording a quantity of extracted characteristic point and generating a new characteristic template;

comparing the characteristic point of the new characteristic template with the characteristic point of the characteristic template in the template library; and if a quantity of the characteristic point of the new characteristic template that match the characteristic point of each characteristic template in the template library is less than a preset value, storing the new characteristic template into the template library.

In some embodiments, the method further includes:

when a tracking failure occurs in the process of controlling the unmanned aerial vehicle to track the tracked target, extracting a SIFT characteristic from the current image on which the tracking failure occurs, to obtain a characteristic point set S1;

reading the characteristic template from the template library, to obtain a characteristic point set T1 of the characteristic template;

matching the characteristic point set T1 with the characteristic point set S1, and searching for the tracked target according to a matching result; and continuously tracking the tracked target if the tracked target is found, or else repeating the foregoing process until the tracked target is found.

In some embodiments, the method further includes:

evaluating an erroneous negative example and an erroneous positive example that appear when a matching error occurs; and generating a learning sample according to an evaluation result, and updating the characteristic template and the characteristic point of the tracked target that are stored in the template library.

In some embodiments, the calculating the movement speed, the movement direction and the location on the current image that are of the tracked target includes:

calculating, between consecutive neighboring frames of images, the movement speed, the movement direction and the location on the current image that are of the tracked target by adopting a Lucas-Kanade (LK) optical flow algorithm.

In some embodiments, the method further includes:

when the tracked target is always located on the image collected by the photographing apparatus and remains stable, controlling the photographing apparatus to shoot the tracked target; or when the tracked target is always located on the image collected by the photographing apparatus and another photographing apparatus is disposed on the unmanned aerial vehicle, controlling the another photographing apparatus to shoot the tracked target.

According to another aspect, an embodiment of the present invention provides a control apparatus for tracking and shooting a target, applied to an unmanned aerial vehicle shooting, and the control apparatus includes:

an obtaining unit, configured to: control a photographing apparatus on the unmanned aerial vehicle to collect an image in a tracking and shooting process, and obtain the collected image;

a selecting unit, configured to select a tracked target in the image;

a calculation unit, configured to calculate a movement speed, a movement direction and a location on the current image that are of the tracked target by comparing consecutive neighboring frames of images;

a tracking unit, configured to control, according to the calculated movement speed, movement direction and location on the current image, the unmanned aerial vehicle to track the tracked target, so as to make the tracked target always locate on the image collected by the photographing apparatus; and a shooting control unit, configured to: when the tracked target is always located on the image collected by the photographing apparatus, control the photographing apparatus to shoot the tracked target; or configured to: when the tracked target is always located on the image collected by the photographing apparatus and another photographing apparatus is disposed on the unmanned aerial vehicle, control the another photographing apparatus to shoot the tracked target.

In some embodiments, the selecting unit includes a signal obtaining subunit configured to obtain a user input signal that indicates a selection of the tracked target from the user, and a target determining subunit configured to determine the tracked target on the image according to the user input signal; or the selecting unit includes an analysis subunit configured to identify and analyze the collected image, and a target identifying subunit configured to identify a moving target on the image as the tracked target according to an analysis result of the analysis subunit.

In some embodiments, the control apparatus further includes:

a characteristic extraction unit, configured to extract a characteristic point of the tracked target after the selecting unit selects the tracked target;

a template generation unit, configured to record a set of extracted characteristic point and a quantity of the extracted characteristic point, and generate a characteristic template; and a storage unit, configured to store the characteristic template into a template library.

In some embodiments, the characteristic extraction unit is further configured to: extract a characteristic point of the tracked target in a process of controlling the unmanned aerial vehicle to track the tracked target;

the template generation unit is further configured to record a quantity of extracted characteristic point and generate a new characteristic template;

the control apparatus further includes a comparison unit, configured to compare the characteristic point of the new characteristic template with the characteristic point of the characteristic template in the template library; and the storage unit is further configured to: when a comparison result of the comparison unit is that a quantity of the characteristic point of the new characteristic template that match the characteristic point of each characteristic template in the template library is less than a preset value, store the new template into the template library.

In some embodiments, the characteristic extraction unit is further configured to: when the tracking unit has a tracking failure, extract a SIFT characteristic from the current image on which the tracking failure occurs, to obtain a characteristic point set S1; and the control apparatus further includes:

a reading unit, configured to read the characteristic template from the template library, to obtain a characteristic point set T1 of the characteristic template; and a matching unit, configured to match the characteristic point set T1 with the characteristic point set S1, and search for the tracked target according to a matching result, where the tracking unit is further configured to continuously track the tracked target when the tracked target is found.

In some embodiments, the control apparatus further includes: an evaluation unit, configured to: evaluate an erroneous negative example and an erroneous positive example that appear when a matching error occurs; and an update unit, configured to generate a learning sample according to an evaluation result, and update the characteristic template and characteristic point of the tracked target that are stored in the template library.

In some embodiments, the calculation unit is further configured to calculate, between consecutive neighboring frames of images, the movement speed, the movement direction and the location on the current image that are of the tracked target by adopting an LK optical flow algorithm.

According to still another aspect, an embodiment of the present invention provides a system for tracking and shooting a target, where the system includes the control apparatus, the unmanned aerial vehicle and the photographing apparatus mounted on the unmanned aerial vehicle described in the foregoing, where the control apparatus is configured to control, according to an image collected by the photographing apparatus, the unmanned aerial vehicle to track a tracked target, so as to make the tracked target locate on the image collected by the photographing apparatus, and the photographing apparatus is configured to shoot the tracked target.

Compared with the prior art, beneficial effects of the embodiments of the present invention are: an image collected by a photographing apparatus is obtained, a tracked target is selected, an unmanned aerial vehicle is controlled to track the tracked target, and the photographing apparatus is controlled in a tracking process to shoot the tracked target. Therefore, there is no need any longer to manually remotely control the unmanned aerial vehicle to track a moving target. In this way, locating precision is high, the moving target can be tracked and shot, and a high-quality video or photo can be obtained.

DETAILED DESCRIPTION

To make objectives, technical solutions and advantages of the present invention more understandable and comprehensible, the present invention is further described in detail below with reference to accompanying drawings and embodiments. It should be understood that, specific embodiments described herein are merely used for explaining the present invention, but not used for limiting the present invention.

Embodiment 1 of the present invention provides a method for tracking and shooting a target. The method is applied to an unmanned aerial vehicle shooting. In this embodiment, a photographing apparatus and a control apparatus are mounted on the unmanned aerial vehicle. The control apparatus can control, according to an image collected by the photographing apparatus, the unmanned aerial vehicle to track and shoot a tracked target, so that a location of the tracked target remains stable on the image collected by the photographing apparatus. The control apparatus may be mounted on the unmanned aerial vehicle, or may communicate with the unmanned aerial vehicle and the photographing apparatus in a wireless communication manner. The photographing apparatus in this embodiment may be an action camera, to shoot the tracked target. A person skilled in the art may understand that, there may be two photographing apparatuses, to separately perform two functions of fixed-location shooting and motion shooting. That is, the first photographing apparatus obtains a fixed-location image, and the control apparatus determines the tracked target according to an analysis of the fixed-location image; the second photographing apparatus obtains a motion image, and is configured to track and shoot the tracked target.

Figure 1:
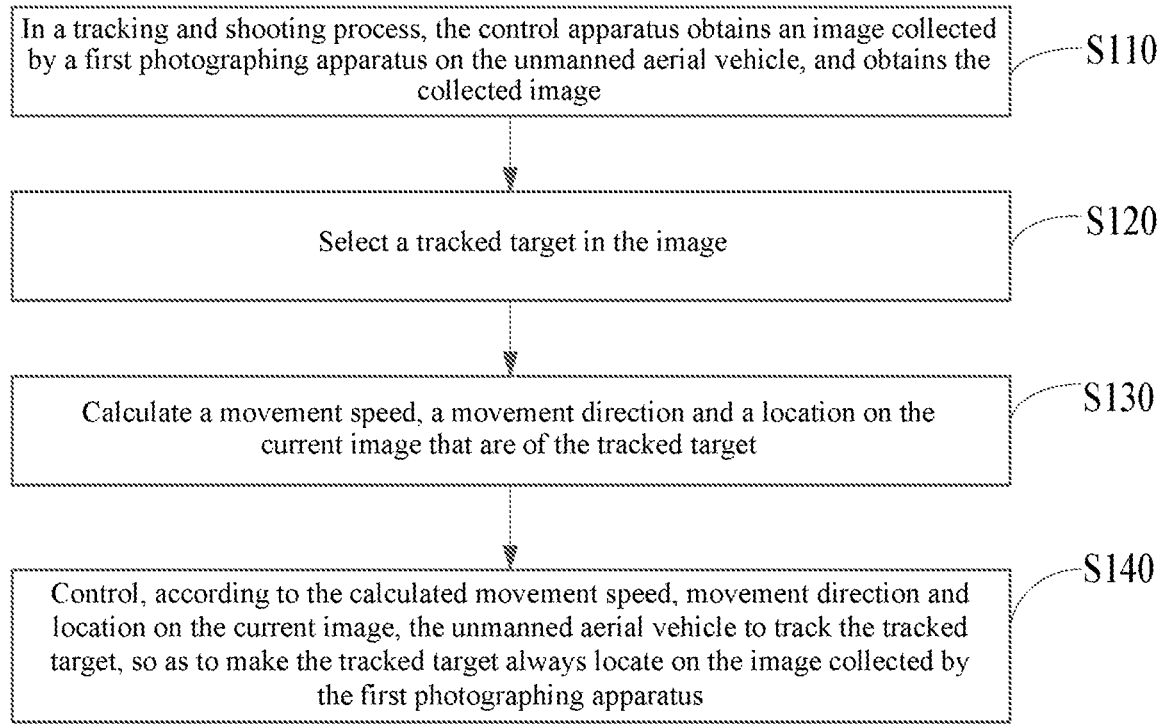
FIG. 1 is a flowchart of a method for tracking and shooting a target according to a first embodiment of the present invention.

To make descriptions clearer, the following describes the method in this embodiment from the perspective of the control apparatus. Referring to FIG. 1, a procedure of the method includes:

S110: In a tracking and shooting process, the control apparatus obtains an image collected by the first photographing apparatus on the unmanned aerial vehicle, and obtains the collected image.

S120: Select a tracked target in the image.

S130: Calculate a movement speed, a movement direction and a location on the current image that are of the tracked target.

S140: Control, according to the calculated movement speed, movement direction and location on the current image, the unmanned aerial vehicle to track the tracked target, so as to make the tracked target always locate on the image collected by the first photographing apparatus.

In actual application, step S120, selecting the tracked target in the image may be implemented in the following manners:

Manner 1: Manual Selection:

obtaining a user input signal that indicates that a user selects the tracked target, and determining the tracked target on the image according to the user input signal. The user may input a signal only through a user input interface, where the signal indicates a tracked target that needs to be selected. The control apparatus may determine, as the tracked target according to the obtained user input signal, the target selected by the user.

Manner 2: Automatic Selection:

identifying and analyzing the collected image, and determining a moving target on the image as the tracked target according to an analysis result.

This manner further includes two manners: one is selection by means of a frame difference method, and the other is selection by means of a connected region extraction method.

(1) Selection by Means of a Frame Difference Method:

Consecutive neighboring frame images are compared, and a moving target in the images is determined as the tracked target according to a comparison result. Because a continuous video flow scenario has continuity, when a target is static, a change between images of consecutive frames is very small. On the contrary, if the target moves, an obvious frame difference is caused. The neighboring frame difference method performs a moving target detection by using a difference between two or more consecutive video images, thereby implementing automatic selection of the moving target.

The moving target detection by means of the neighboring frame difference method is suitable for a scenario in which the background remains relatively static, and the moving target moves relative to the background. Therefore, when the unmanned aerial vehicle automatically selects the moving target, the unmanned aerial vehicle needs to be kept relatively static (a movement speed is 0, or a movement speed is relatively low and may be ignored).

Specific Calculation Steps are as Follows:

An absolute value of a frame difference is directly calculated, and a difference between pixels corresponding to a $k^{th}$ frame picture and a $k-1^{th}$ frame picture is calculated. A determining condition of the movement detection is as follows:

$$\sum_{(x,y) \in A} |S(x, y, t) - S(x, y, t - \Delta t)| > T. \quad \text{Formula 1}$$

A binary difference image D(x, y) is obtained according to the foregoing formula 1.

$$D_k(x, y) = \begin{cases} 1 & \text{if } |S(x, y, t) - S(x, y, t - \Delta t)| > T \\ 0 & \end{cases} \quad \text{Formula 2}$$

S(x, y, t) is a grayscale value of a brightness image sequence at a time point t (x, y), $\Delta t$ is an integer multiple of a frame interval, and T is a threshold that determines sensitivity of the movement detection.

After the binary image is obtained, dilation and erosion are performed by means of morphological processing. Most noise points can be filtered out, to obtain a relatively clear target.

(2) Selection by Means of a Connected Region Extraction Method:

A basic idea of region growing is to gather together pixels having similar properties, to form a region. A specific implementation manner is: for each separate region, a seed pixel is found to serve as a starting point of growth, and then pixels that are in the neighborhood of the seed pixel and that have properties same as or similar to those of the seed pixel (which are determined according to a pre-determined growing rule or a similarity criterion) are combined into a region in which the seed pixel is located. The foregoing process continues to be performed by using these new pixels as new seed pixels, until no qualified pixel can be included any more, and then a region is formed by means of growing. Performing detection of a test image, after all regions are formed, calculating areas of all connected regions, and a region whose area is largest is considered as a target region. The target region is the tracked target.

It should be noted that, if a plurality of qualified moving targets appear in actual application, the largest moving target may be selected as the moving target that needs to be tracked.

In actual application, an outer rectangle of the tracked target may be stacked on a collected image.

Specifically, in step S130, the movement speed, the movement direction and the location on the current image that are of the tracked target may be calculated between consecutive neighboring frames of images by adopting an LK (Lucas-Kanade) optical flow algorithm.

This method represents the tracked target by adopting a target box (that is, the outer rectangle), and estimates the movement of the target between the images of the consecutive neighboring frames.

The principle is as follows: Several pixels are selected from a target box of a previous frame picture as characteristic points, and locations that are on a current frame picture and that correspond to the characteristic points on the previous frame picture are searched for on a next frame picture. Then, displacement variations of the several characteristic points between images of neighboring frames are sequenced, to obtain a median of the displacement variations, 50% characteristic points whose displacement variations are less than the median are obtained by using the median, and the 50% characteristic points are used as characteristic points of a next frame. The rest is deduced by analogy, to achieve an objective of dynamically updating characteristic points.

Figure 2:
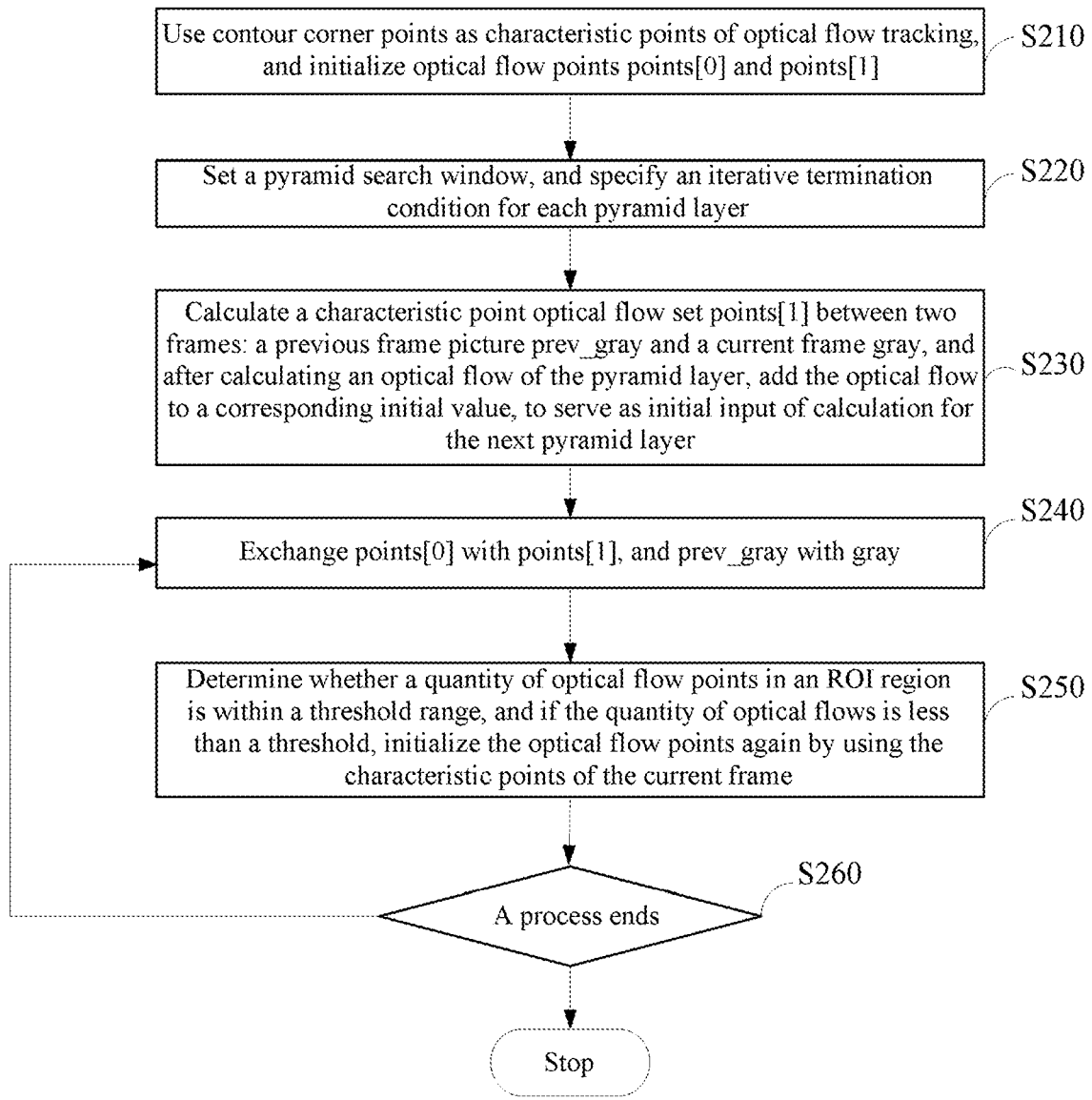
FIG. 2 is a flowchart of step S130 of calculating a movement speed, a movement direction and a location on the current image that are of the tracked target according to the method shown in FIG. 1.

Basic steps of optical flow tracking are shown in FIG. 2:

S210: Use contour corner points as characteristic points of optical flow tracking, and initialize optical flow points points[0] and points[1].

S220: Set a pyramid search window, and specify an iterative termination condition for each pyramid layer.

S230: Calculate a characteristic point optical flow set points[1] between two frames: a previous frame picture prev_gray and a current frame picture gray, and after calculating an optical flow of the pyramid layer, add the optical flow to a corresponding initial value, to serve as initial input of calculation for the next pyramid layer.

S240: Exchange points[0] with points[1], and prev_gray with gray.

S250: Determine whether a quantity of optical flow points in an ROI region is within a threshold range, and if the quantity of optical flows is less than a threshold, initialize the optical flow points again by using the characteristic points on the current frame picture.

S260: If a process ends, return to the fourth step and sequentially perform the steps; otherwise, stop tracking.

It should be noted that, the optical flow method mainly calculates a moving optical flow of pixels, that is, a speed, to form an optical flow speed field. Therefore, the optical flow method needs to preset a quantity of characteristic points of the optical flow that needs to be calculated, and more characteristic points indicate a higher precision of a final result.

In a preferred solution, after step S120, the method further includes:

S121: Extract a characteristic point of the tracked target.

S122: Record a set of extracted characteristic point and a quantity of the extracted characteristic points, and generate a first characteristic template.

S123: Store the first characteristic template into a template library.

In a possible scenario, in a tracking process, a tracking failure may occur. In a preferred solution, a lost target may be searched for by means of a detection step.

In this embodiment, parallel processing is performed by adopting a mode of complementation between a tracking unit and a detection unit. First, the tracking unit assumes that object movement between images of neighboring frames is limited, and the tracked target is visible, so as to estimate movement of the tracked target. If the tracked target disappears from a visual field of a photographing apparatus, a tracking failure is caused. The detection unit assumes that each frame picture is independent from each other, and full image search is performed on each frame picture according to a previously detected and learned target model, to locate a region in which the tracked target may appear.

Figure 3:
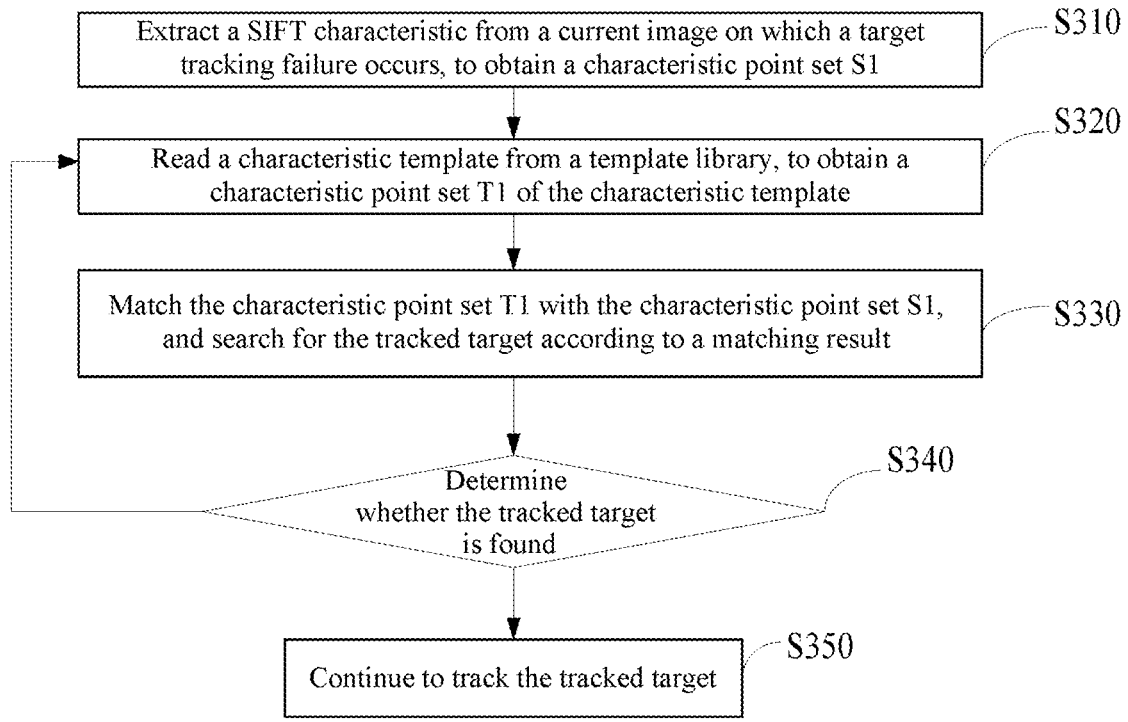
FIG. 3 is a flowchart of a detection step performed when a tracking failure occurs according to the method shown in FIG. 1.

Referring to FIG. 3, specifically, detection steps include:

S310: Extract a SIFT characteristic from a current image on which a target tracking failure occurs, to obtain a characteristic point set S1.

S320: Read the first characteristic template from a template library, to obtain a characteristic point set T1 of the first characteristic template.

S330: Match the characteristic point set T1 with the characteristic point set S1, and search for the tracked target according to a matching result.

S340: Determine whether the tracked target is found, and if the tracked target is found, perform step S350; otherwise, perform step S320.

S350: Continue to track the tracked target.

Specifically, when the matching is performed between the characteristic point sets T1 and S1, it is determined that a moving target that has most matched characteristic points is a matched moving target; calculation may be performed by adopting a Euclidean distance in the matching process.

In another possible scenario, when a detection step is performed, a matching error may also occur.

A matching error occurring on the detection unit generally has two cases: an erroneous negative example and an erroneous positive example. A model and a key characteristic point of the tracked target may be updated by adopting a learning unit, so as to prevent a similar error from occurring afterwards. A specific method is as follows:

The learning unit evaluates an erroneous negative example and an erroneous positive example that may appear in the tracking process.

A learning sample is generated according to an evaluation result, and the first characteristic template and characteristic point of the tracked target that are stored in the template library are updated.

Figure 4:
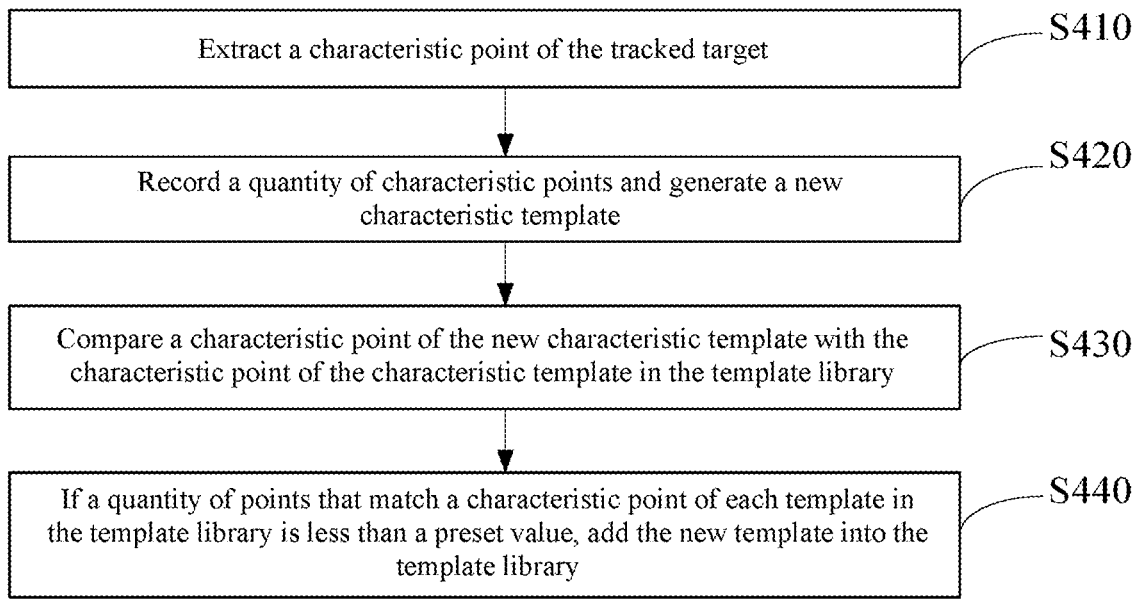
FIG. 4 is a flowchart of learning a tracked target when the tracked target is tracked according to the method shown in FIG. 1.

In a preferred solution, when the tracked target is tracked, the tracked target may be further learned. Referring to FIG. 4, the solution includes:

S410: Extract a characteristic point of the tracked target.

S420: Record a quantity of characteristic points and generate a second characteristic template.

S430: Compare a characteristic point of the second characteristic template with the characteristic point of the characteristic template in the template library.

S440: If a quantity of points that match a characteristic point of each template in the template library is less than a preset value, store the new template into the template library.

In a possible scenario, the method further includes:

when the tracked target is always located on the image collected by the photographing apparatus and remains stable, controlling the photographing apparatus to shoot the tracked target.

In another possible scenario, another photographing apparatus may be disposed on the unmanned aerial vehicle, and the method further includes:

when the tracked target is always located on the image collected by the photographing apparatus and remains stable, controlling the another photographing apparatus to shoot the tracked target.

According to the method for tracking and shooting a target in this embodiment, a photographing apparatus and a control apparatus are disposed on an unmanned aerial vehicle, the control apparatus selects a tracked target by obtaining an image collected by the photographing apparatus, and controls the unmanned aerial vehicle to track and shoot the tracked target, so that in a tracking process, a location of the tracked target remains stable on the image collected by the photographing apparatus. Therefore, there is no need any longer to manually remotely control an unmanned aerial vehicle to track the moving target. In this way, locating precision is high, various moving targets can be tracked and shot, and a high-quality video or photo can be obtained.

Figure 5:
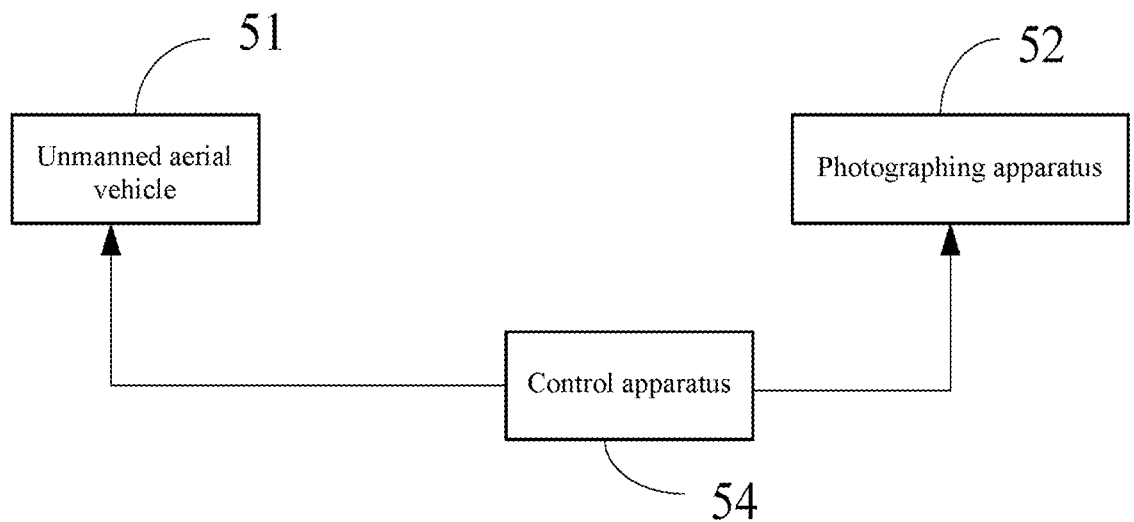
FIG. 5 is a schematic structural diagram of a system for tracking and shooting a target according to a second embodiment of the present invention.

Based on the foregoing embodiment, Embodiment 2 of the present invention provides a system for tracking and shooting a target. Referring to FIG. 5, the system includes an unmanned aerial vehicle 51, a photographing apparatus 52 and a control apparatus 54 mounted on the unmanned aerial vehicle. The control apparatus 54 is configured to control, according to an image collected by the photographing apparatus 52, the unmanned aerial vehicle 51 to track a tracked target, and control, in a tracking process, the photographing apparatus 52 to shoot the tracked target. In actual application, the control apparatus 54 may be mounted on the unmanned aerial vehicle 51, or may communicate with the unmanned aerial vehicle 51 and the photographing apparatus 52 in a wireless communication manner.

Figure 6:
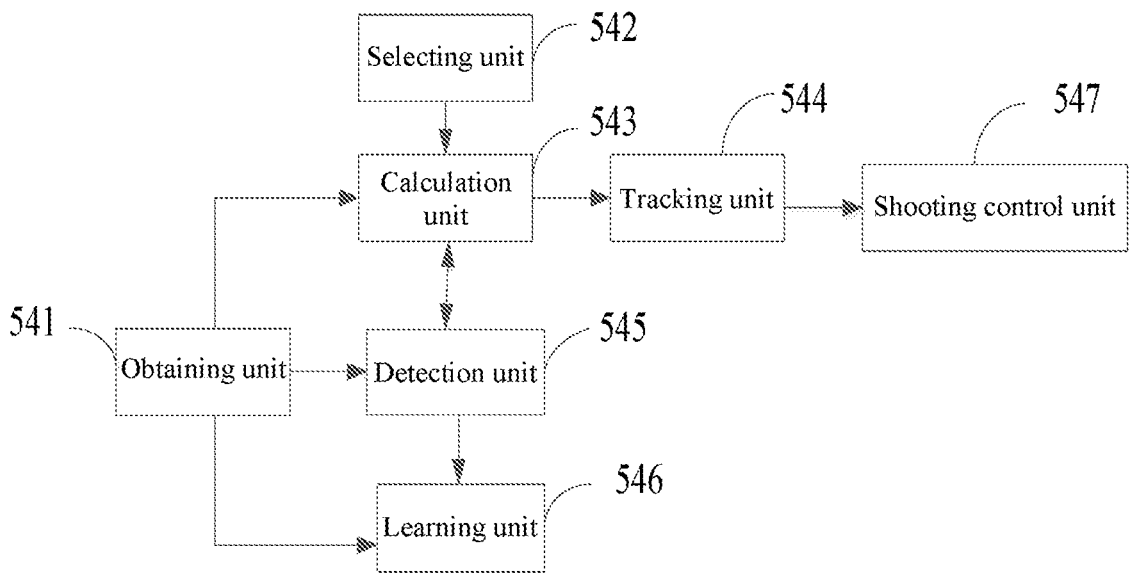
FIG. 6 is a schematic structural diagram of units of a control apparatus in the system shown in FIG. 5.

Referring to FIG. 6, the control apparatus 54 includes:

an obtaining unit 541, configured to control a photographing apparatus on the unmanned aerial vehicle to collect an image, and obtain the collected image;

a selecting unit 542, configured to select a tracked target from the collected image;

a calculation unit 543, configured to calculate (for example, according to an LK optical flow algorithm) a movement speed, a movement direction and a location on the current image that are of the tracked target by comparing consecutive neighboring frames of images;

a tracking unit 544, configured to control, according to the calculated movement speed, movement direction and location on the current image, the unmanned aerial vehicle to track the tracked target, so as to make a location of the tracked target remain stable on the image collected by the photographing apparatus; and a shooting control unit 547, configured to: when the tracked target is always located on the image collected by the photographing apparatus 52, control the photographing apparatus 52 to shoot the tracked target; or configured to: when the tracked target is always located on the image collected by the photographing apparatus 52 and another photographing apparatus is disposed on the unmanned aerial vehicle, control the another photographing apparatus to shoot the tracked target.

In a preferred solution, when the selecting unit 542 selects the tracked target, the selection may be manually performed, or the selection may be performed by means of a frame difference method, or the selection may be performed by means of a connected region extraction method. Correspondingly, when the tracked target is manually selected, the selecting unit 542 includes a signal obtaining subunit, configured to obtain a user input signal that indicates that a user selects the tracked target; and a target determining subunit, configured to determine the tracked target on the image according to the user input signal. When the tracked target is automatically selected, the selecting unit includes an analysis subunit, configured to identify and analyze the collected image; and a target identifying subunit configured to identify a moving target on the image as the tracked target according to an analysis result. The identification and analysis by the analysis subunit may include comparison and analysis by means of the frame difference method, or the identification and analysis by means of the connected region extraction method.

In a possible scenario, the apparatus further includes a detection unit 545. The detection unit 545 includes:

a characteristic extraction unit, configured to extract a characteristic point of the tracked target after the selecting unit selects the tracked target;

a template generation unit, configured to record a set of extracted characteristic point and a quantity of the extracted characteristic points, and generate a first characteristic template; and a storage unit, configured to store the first characteristic template into a template library.

In a possible scenario, the apparatus further includes a learning unit 546. The learning unit 546 includes:

a characteristic extraction unit, configured to extract the characteristic point of the tracked target in a process of tracking the tracked target;

a template generation unit, configured to record a quantity of characteristic points and generate a second characteristic template;

a comparison unit, configured to compare a characteristic point of the second characteristic template with a characteristic point of the first characteristic template in the template library; and a storage unit, configured to: when a comparison result of the comparison unit is that a quantity of characteristic points of the second characteristic template that match a characteristic point of each template in the template library is less than a preset value, store the new template into the template library.

In a possible scenario, the detection unit 545 further includes a reading unit and a matching unit.

The characteristic extraction unit is further configured to: when the tracking unit has a tracking failure, extract an SIFT characteristic from the current image on which the target tracking failure occurs, to obtain a characteristic point set S1.

The reading unit is configured to read the first characteristic template from the template library, to obtain a characteristic point set T1 of the first characteristic template.

The matching unit is configured to perform matching between the characteristic point set T1 and the characteristic point set S1, and search for the tracked target according to a matching result.

The tracking unit 543 is further configured to continue to track the tracked target when the tracked target is found.

In a possible scenario, the learning unit 546 further includes an evaluation unit and an update unit. The evaluation unit is configured to: when a matching error occurs on the detection unit, evaluate an erroneous negative example and an erroneous positive example that may appear in the tracking process; and the update unit is configured to generate a learning sample according to an evaluation result, and update the "characteristic template" and "characteristic point" of the tracked target that are in the template library.

According to the system for tracking and shooting a target in this embodiment, a photographing apparatus and a control apparatus are disposed on an unmanned aerial vehicle, a tracked target is selected by obtaining an image collected by the photographing apparatus, and the unmanned aerial vehicle is controlled to track and shoot the tracked target. Therefore, there is no need any longer to manually remotely control an unmanned aerial vehicle to track a moving target. In this way, locating precision is high, various moving targets can be tracked and shot, and a high-quality video or photo can be obtained.

Figure 7:
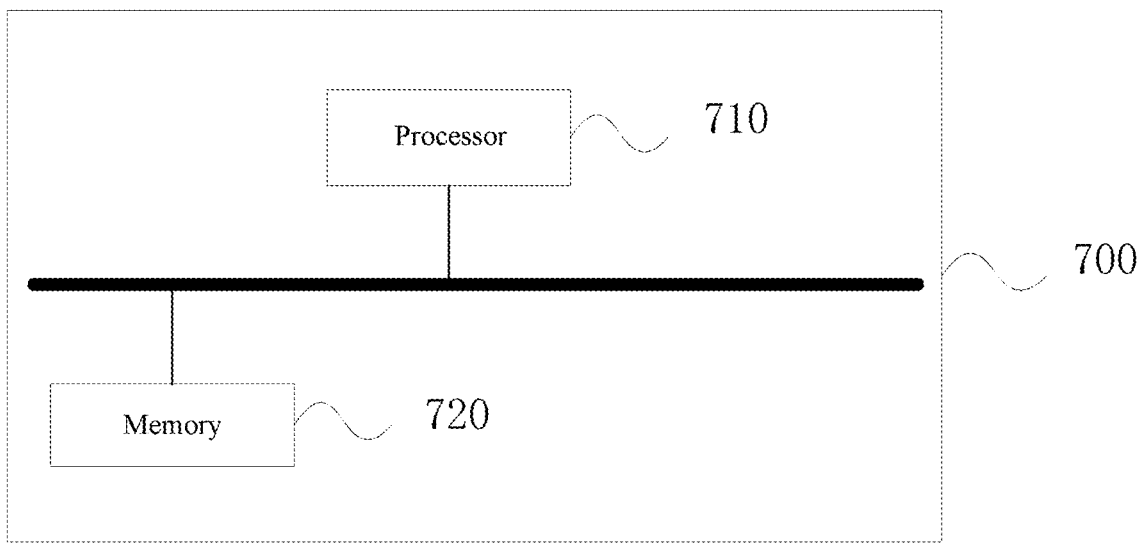
FIG. 7 is a schematic structural diagram of hardware of an electronic device for performing a method for tracking and shooting a target according to a third embodiment of the present invention.

FIG. 7 is a schematic structural diagram of hardware of an electronic device for performing a method for tracking and shooting a target according to a third embodiment of the present invention. As shown in FIG. 7, the electronic device 700 includes:

one or more processors 710 and a memory 720, where one processor 710 is used as an example in FIG. 7.

The processor 710 and the memory 720 may be connected to each other by means of a bus or in another manner. The connection by means of a bus is used as an example in FIG. 7.

The memory 720 serves as a nonvolatile computer readable storage medium, and may be configured to store a nonvolatile software program and a nonvolatile computer executable program and module, such as a program instruction/module (such as the obtaining unit 541, the selecting unit 542, the calculation unit 543, the tracking unit 544, the detection unit 545, the learning unit 546 and the shooting control unit 547 shown in FIG. 6) corresponding to a method for tracking and shooting a target according to an embodiment of the present invention.

The processor 710 runs the nonvolatile software program, program and module stored in the memory 720, to perform various functional applications of a server and data processing, that is, implement the method for tracking and shooting a target in the foregoing method embodiment.

The memory 720 may include a program storage area and a data storage area, where the program storage area may store an operating system and an application program that is required by at least one function; and the data storage area may store data created according to usage of a control apparatus for tracking and shooting a target, or the like. In addition, the memory 720 may include a high speed random access memory, and may also include a non-volatile memory, such as at least one magnetic disk storage device, a flash memory, or another non-volatile solid-state storage device. In some embodiments, the memory 720 optionally includes a memory that is remotely disposed relative to the processor 710, and these remote memories may connect, by means of a network, to the control apparatus for tracking and shooting a target. Examples of the network include, but are not limited to, the Internet, an intranet, a local area network, a mobile communications network, and a combination thereof.

The one or more modules are stored in the memory 720, and when being executed by the one or more processors 710, perform the method for tracking and shooting a target in any of the foregoing method embodiments, for example, perform the above-described procedure of S110 to S140 in the method in FIG. 1, step S210 to step S260 in FIG. 2, detection step S310 to detection step S350 in FIG. 3 and steps S410 to S440 in FIG. 4, to implement functions of the units 541 to 547 in FIG. 6.

The foregoing product may perform the method provided in the third embodiment of the present invention, and has a functional module and a beneficial effect corresponding to execution of the method. For technical details not described in detail in this embodiment, refer to the method provided in another embodiment of the present invention.

The electronic device in the third embodiment of the present invention exists in a plurality of forms, and includes but is not limited to:

(1) Portable entertainment device: This device can display and play multimedia content. The device includes: an audio and video player (such as an iPod—), a handheld game console, an e-book, an intelligent toy or a portable in-vehicle navigation device.

(2) Server: a device that provides a computing service. The server includes a processor, a hard disk, a memory, a system bus and the like. An architecture of the server is similar to that of a general-purpose computer. However, because the server needs to provide a highly reliable service, the server has relatively high requirements on such aspects as a processing capability, stability, reliability, security, scalability and manageability.

(3) Another electronic device that has a data exchange function.

A fourth embodiment of the present invention provides a nonvolatile computer readable storage medium. The computer readable storage medium stores a computer executable instruction. The computer executable instruction is executed by one or more processors, such as the processor 710 in FIG. 7, and can enable the one or more processors to perform the method for tracking and shooting a target in any of the foregoing method embodiments, for example, perform the procedure of S110 to S140 in the method in FIG. 1 described in the foregoing, step S210 to step S260 in FIG. 2, detection step S310 to detection step S350 in FIG. 3 and steps S410 to S440 in FIG. 4, to implement functions of the units 541 to 547 in FIG. 6.

The apparatus embodiments described in the foregoing are merely exemplary. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments.

It should be understood that the apparatus and method disclosed in the present invention may also be implemented in other manners. For example, the module and unit division in the apparatus is merely logical function division and may be other division in actual implementation. For example, a plurality of units or modules may be combined or integrated into another system, or some features may be ignored or not performed. In addition, the displayed or discussed mutual couplings or direct couplings or communications connections may be indirect couplings or communications connections implemented by means of some interfaces, apparatuses or units, and may be implemented in electrical, mechanical or another form.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

If implemented in the form of software functional units and sold or used as an independent product, the integrated units may be stored in a computer-readable storage medium. Based on such understanding, a technical solution of the present invention essentially or a portion that has contributions to the prior art or all or a portion of the technical solution may be embodied in a software product form. The computer software product is stored in a storage medium, and includes several instructions used to make one computer device (which may be a personal computer, a server, a network device, or the like) perform all or some steps of the method in the embodiments of the present invention. The foregoing storage medium includes various mediums that can store program code, for example, a USB disk, a mobile hard disk, a read-only memory, a random access memory, a magnetic disk, and an optical disc.

The foregoing descriptions are merely preferred embodiments of the present invention, but are not intended to limit the present invention. Any modification, equivalent replacement, or improvement made without departing from the spirit and principle of the present invention should fall within the scope of the present invention.

What is claimed is:

1. A method for tracking and shooting a target, applied to an unmanned aerial vehicle shooting, wherein the method comprises:
    selecting a tracked target in an image shot by an photographing apparatus of the unmanned aerial vehicle;
    calculating a movement speed, a movement direction and a location on a current image that are of the tracked target; and
    controlling, according to the calculated movement speed, movement direction and location on the current image, the unmanned aerial vehicle to track the tracked target, so as to make the tracked target always locate on an image collected by the photographing apparatus;
    wherein the method further comprises:
    extracting a characteristic point of the tracked target;
    recording a set of extracted characteristic point and a quantity of the extracted characteristic point to generate a first characteristic template; and
    storing the first characteristic template into a template library;
    wherein the method further comprises:
    when a tracking failure occurs in the process of controlling the unmanned aerial vehicle to track the tracked target, extracting a SIFT characteristic from the current image on which the tracking failure occurs, to obtain a characteristic point set S1;
    reading the first characteristic template from the template library, to obtain a characteristic point set T1 of the first characteristic template;
    matching the characteristic point set T1 with the characteristic point set S1, and searching for the tracked target according to a matching result; and
    determining the tracked target is found.

2. The method according to claim 1, wherein the selecting the tracked target in the image shot by the photographing apparatus of the unmanned aerial vehicle, comprises:
    selecting the tracked target by a user.

3. The method according to claim 2, wherein the selecting the tracked target by the user comprises:
    obtaining the user input signal that indicates a selection of the tracked target from the user; and
    determining the tracked target according to the user input signal.

4. The method according to claim 2, wherein the selecting the tracked target in the image shot by the photographing apparatus of the unmanned aerial vehicle, comprises:
    selecting the tracked target automatically.

5. The method according to claim 4, wherein the selecting the tracked target automatically comprises:
    identifying and analyzing the image; and
    determining a moving target on the image as the tracked target according to an analysis result.

6. The method according to claim 1, wherein the calculating the movement speed, the movement direction and the location on the current image that are of the tracked target comprises:
    calculating, between consecutive neighboring frames of images, the movement speed, the movement direction and the location on the current image that are of the tracked target by adopting a Lucas-Kanade (LK) optical flow algorithm.

7. The method according to claim 1, wherein the determining the tracked target is found comprises:
    determining a moving target that has most matched characteristic points is the tracked target according to the matching performed between the characteristic point sets T1 and the characteristic point set S1.

8. The method according to claim 1, wherein the method further comprises:
    if a matching error occurred during matching the characteristic point set T1 with the characteristic point set S1, evaluating an erroneous negative example and an erroneous positive example that appear; and
    generating a learning sample according to an evaluation result, and updating the first characteristic template and the characteristic point of the tracked target that are stored in the template library.

9. The method according to claim 8, wherein generating the learning sample according to the evaluation result, and updating the first characteristic template and the characteristic point of the tracked target that are stored in the template library, comprises:
    extracting a characteristic point of the tracked target;
    recording a quantity of extracted characteristic point and generating a second characteristic template;
    comparing the characteristic point of the second characteristic template with the characteristic point of the first characteristic template in the template library; and if a quantity of the characteristic point of the second characteristic template that match the characteristic point of each first characteristic template in the template library is less than a preset value, storing the second characteristic template into the template library.

10. An unmanned aerial vehicle, comprising:
a vehicle body;
an arm, coupled to the vehicle body;
an actuating apparatus, disposed on the arm;
a photographing apparatus, coupled to the vehicle body; and
a processor, coupled to the vehicle body; wherein
the processor is configured to:
select a tracked target in an image shot by the photographing apparatus;
calculate a movement speed, a movement direction and a location on a current image that are of the tracked target; and
control, according to the calculated movement speed, movement direction and location on the current image, the unmanned aerial vehicle to track the tracked target, so as to make the tracked target always locate on an image collected by the photographing apparatus;
wherein the processor is further configured to:
extract a characteristic point of the tracked target;
record a set of extracted characteristic point and a quantity of the extracted characteristic point to generate a first characteristic template; and
store the first characteristic template into a template library;
wherein the processor is further configured to:
when a tracking failure occurs in the process of controlling the unmanned aerial vehicle to track the tracked target, extract a SIFT characteristic from the current image on which the tracking failure occurs, to obtain a characteristic point set S1;
read the first characteristic template from the template library, to obtain a characteristic point set T1 of the first characteristic template;
match the characteristic point set T1 with the characteristic point set S1, and search for the tracked target according to a matching result; and
determine the tracked target is found.

11. The unmanned aerial vehicle according to claim 10, wherein the processor is further configured to:
obtain a user input signal that indicates a selection of the tracked target from the user; and
determine the tracked target according to the user input signal.

12. The unmanned aerial vehicle according to claim 11, wherein the processor is further configured to:
identify and analyze the image;
determine a moving target on the image as the tracked target according to an analysis result.

13. The unmanned aerial vehicle according to claim 10, wherein the processor is further configured to:
calculate, between consecutive neighboring frames of images, the movement speed, the movement direction and the location on the current image that are of the tracked target by adopting a Lucas-Kanade (LK) optical flow algorithm.

14. The unmanned aerial vehicle according to claim 10, wherein the processor is further configured to:
determine a moving target that has most matched characteristic points is the tracked target according to the matching performed between the characteristic point sets T1 and the characteristic point set S1.

15. The unmanned aerial vehicle according to claim 10, wherein the processor is further configured to:
if a matching error occurred during matching the characteristic point set T1 with the characteristic point set S1, evaluate an erroneous negative example and an erroneous positive example that appear;
generate a learning sample according to an evaluation result, and update the first characteristic template and the characteristic point of the tracked target that are stored in the template library.

16. The unmanned aerial vehicle according to claim 15, wherein the processor is further configured to:
extract a characteristic point of the tracked target;
record a quantity of extracted characteristic point and generating a second characteristic template;
compare the characteristic point of the second characteristic template with the characteristic point of the first characteristic template in the template library; and
if a quantity of the characteristic point of the second characteristic template that match the characteristic point of each first characteristic template in the template library is less than a preset value, store the second characteristic template into the template library.

* * * * *